US009435042B2

(12) United States Patent
Zhou et al.

(10) Patent No.: US 9,435,042 B2
(45) Date of Patent: Sep. 6, 2016

(54) SYSTEM AND METHOD FOR SELECTIVE ELECTROCHEMICAL REDUCTION OF CARBON DIOXIDE EMPLOYING AN ANODIZED SILVER ELECTRODE

(71) Applicant: Toyota Motor Engineering & Manufacturing North America, Inc., Erlanger, KY (US)

(72) Inventors: Li Qin Zhou, Ann Arbor, MI (US); Chen Ling, Ann Arbor, MI (US); Hongfei Jia, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/523,070

(22) Filed: Oct. 24, 2014

(65) Prior Publication Data

US 2016/0115605 A1 Apr. 28, 2016

(51) Int. Cl.
*C25B 1/00* (2006.01)
*C25B 11/08* (2006.01)
*C25B 11/04* (2006.01)

(52) U.S. Cl.
CPC ............ *C25B 11/0405* (2013.01); *C25B 1/00* (2013.01); *C25B 11/0415* (2013.01); *C25B 11/0473* (2013.01)

(58) Field of Classification Search
CPC ............ C25B 1/14; C25B 1/18; C25B 3/04; C25B 11/0415; C25B 11/0473; B01J 23/50
See application file for complete search history.

(56) References Cited

U.S. PATENT DOCUMENTS 2,315,518 A * 4/1943 Gwynn .................... B01J 23/70 204/237
4,461,677 A * 7/1984 Katan ..................... H01M 4/08 205/333
8,592,633 B2 11/2013 Cole et al.
2013/0175181 A1* 7/2013 Kaczur ..................... C25B 3/02 205/345
2014/0291163 A1* 10/2014 Kanan ....................... C25B 3/04 205/555

FOREIGN PATENT DOCUMENTS

CN 101235515 B 6/2010
WO 2014032000 A1 2/2014

OTHER PUBLICATIONS

Shiratsuchi et al. "Pulsed electroreduction of CO2 on silver electrodes." Journal of The Electrochemical Society. Feb. 1996. vol. 143, Issue 2. pp. 582-586.*

Chen et al, Tin Oxide Dependence of the CO2 Reduction Efficiency on Tin Electrodes and Enhanced Activity for Tin/Tin Oxide Thin-Film Catalysts, Journal of the American Chemical Society, Jan. 9, 2012, 3 pages (abstract).

(Continued)

*Primary Examiner* — Steven A. Friday
(74) *Attorney, Agent, or Firm* — Christopher G. Darrow; Darrow Mustafa PC

(57) ABSTRACT

Systems and methods for the electrochemical reduction of carbon dioxide are disclosed. The systems involve an electrochemical cell having a cathode of anodized silver and the methods involve introducing carbon dioxide into such a system and applying a potential. The disclosed systems and methods have improved carbon monoxide production selectivity, support higher current density, and have improved efficiency in comparison to existing silver-based $CO_2$ electroreduction devices.

17 Claims, 5 Drawing Sheets

100 116 e⁻ e⁻ 110 114 120 CO/H2 112 108 118 CO2 102 106 104

(56) References Cited

OTHER PUBLICATIONS

Kostecki et al., Electrochemical Reduction of CO2 at an Activated Silver Electrode, Berichte der Bunsengesellschaft fur physikalische Chemie, Dec. 1994, vol. 98, Issue 12, pp. 1510-1515.
Stoots, High-Temperature Co-Electrolysis of H2O and CO2 for Syngas Production, Nov. 2006, 5 pages.
Augustynski et al., Electroreduction of Carbon Dioxide in Aqueous Solutions at Metal Electrodes, Undated, pp. 1420-1424.
Rosen et al., Ionic Liquid-Mediated Selective Conversion of CO2 to CO at Low Overpotentials, Undated, 2 pages.
Yano et al., Electrochemical Reduction of CO2 at Three-Phase (gas | liquid | solid) and Two-Phase (liquid | solid) Interfaces on Ag Electrodes, Journal of Electroanalytical Chemistry, 2002, pp. 113-118, vol. 533, Sep. 2002.
Cueto et al., Surface Characterization and CO2 Reduction Using Electrodeposited Silver Particles over TiO2 Thin Film, Journal of Nano Research, 2010, pp. 89-100, vol. 9, Feb. 2010.
Lu et al., A Selective and Efficient Electrocatalyst for Carbon Dioxide Reduction, Jan. 30, 2014, 3 pages.
Hori, “Electrochemical CO Reduction on Metal Electrodes”, in: Vayenas, White, Gamboa-Aldeco, Modern Aspects of Electrochemistry (Springer, New York, 2008), pp. 89-189.

* cited by examiner

SYSTEM AND METHOD FOR SELECTIVE ELECTROCHEMICAL REDUCTION OF CARBON DIOXIDE EMPLOYING AN ANODIZED SILVER ELECTRODE

TECHNICAL FIELD

The present invention relates in general to a system and a method for selective and efficient electrochemical reduction of carbon dioxide.

BACKGROUND

Decreasing the quantity of carbon dioxide released into earth's atmosphere by industrial processes is a technical challenge of enormous environmental and economic significance. To be able to achieve significant decreases in atmospheric carbon dioxide production without consequently diminishing industrial output and economic activity would be highly beneficial.

One possible approach to achieving these goals is through the electrochemical reduction of carbon dioxide produced by combustion reactions. Because such an approach produces reduced carbon, this can have the additional benefit of generating useable fuels from what had previously been a greenhouse gas emission. For example, electrochemical reduction of carbon dioxide in an aqueous environment can, under the right conditions, produce a mixture of carbon monoxide and hydrogen gas known as syngas. Such synthetic gas can then be processed by known methods into a variety of useable fuels.

Several metals have been tested as possible electrocatalysts for electrochemical reduction of carbon dioxide. Gold can deliver an appreciable current density and reduce carbon dioxide to carbon monoxide with high selectivity at relatively low potential. But gold is not favorable for large-scale applications due to its low abundance and high cost. Copper exhibits a poor selectivity for carbon monoxide production and requires a greater potential to achieve a current density comparable to that achieved by gold.

Silver-based electrocatalysts can selectively promote the reduction of carbon dioxide to carbon monoxide and are considerably less expensive than gold. However, the common polycrystalline silver electrodes that have been employed require a large overpotential for carbon dioxide reduction and show poor carbon monoxide selectivity at low overpotentials, making silver a presently impractical option as an electrocatalyst for carbon dioxide reduction. Systems and methods which improved silver's efficiency and selectivity as a catalyst for electrochemical reduction of carbon dioxide to carbon monoxide would be beneficial.

SUMMARY

A system and a method for the electrochemical reduction of carbon dioxide to carbon monoxide are provided.

In one implementation, a system for electrochemical reduction of carbon dioxide is disclosed. The system includes a cathode chamber having a catholyte and a cathode containing anodized silver in contact with the catholyte. The system further includes an anode chamber having an anolyte and an anode in contact with the anolyte. The system additionally includes a power source operable to apply a potential between the anode and the cathode, the potential being sufficient to electrochemically reduce carbon dioxide present in the cathode chamber.

In another implementation, a method for electrochemical reduction of carbon dioxide is disclosed. The method includes a step of providing an electrochemical cell; the electrochemical cell having a cathode chamber. The cathode chamber contains a catholyte and a cathode in contact with the catholyte, the cathode containing anodized silver. The electrochemical cell also has an anode chamber, the anode chamber containing an anolyte; and an anode in contact with the anolyte. The method also includes a step of supplying carbon dioxide to the cathode chamber, and a step of applying a potential between the anode and the cathode, the potential sufficient to electrochemically reduce carbon dioxide present in the cathode chamber.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

The present disclosure describes a system and method for the electrochemical reduction of carbon dioxide ($CO_2$). The disclosed system and method enable the electrochemical reduction of $CO_2$ to carbon monoxide with high faradaic efficiency and at relatively low overpotential, in comparison to previous approaches.

The disclosed system and method employ an anodized silver cathode. Anodization of a silver precursor alters the surface morphology of the electrode and improves the catalytic efficiency of the system. When anodized under appropriate conditions, the silver cathode contributes to a system and method which can be useful in greenhouse gas emission control.

Figure 1:
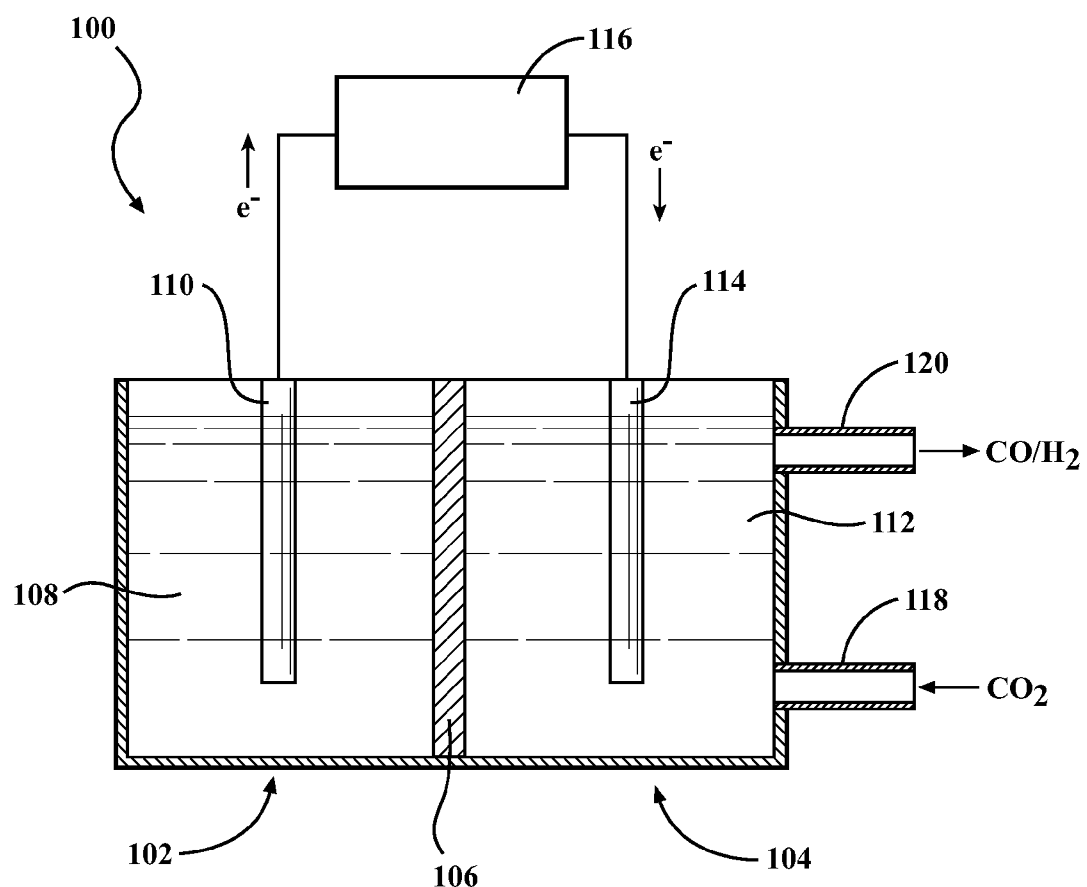
FIG. 1 is a schematic diagram of a system for the electrochemical reduction of carbon dioxide.

A system for the electrochemical reduction of $CO_2$ to CO is disclosed. As shown in FIG. 1, the system 100 comprises an electrolytic cell having an anode chamber 102 and a cathode chamber 104. While any configuration having at least two chambers can be employed, the example of FIG. 1 shows the anode chamber 102 and cathode chamber 104 separated by a separator 106. When employed, such a separator 106 can be a gas impermeable membrane, a barrier preventing exchange of all liquids and gases, or any other barrier effective to prevent gas exchange between the anode chamber 102 and cathode chamber 104.

The anode chamber 102 further includes an anolyte 108 contained by the anode chamber 102 and an anode 110 in contact with the anolyte 108. The cathode chamber 104 further includes a catholyte 112 contained by the cathode chamber 104, and a cathode 114 in contact with the catholyte 112.

The anolyte 108 and the catholyte 112 can be, but need not necessarily be, of the same composition. In some implementations, the catholyte 112 will be an aqueous salt solution and in some implementations, both the anolyte 108 and the catholyte 112 will be an aqueous salt solution.

Non-limiting examples of salts suitable for use in the anolyte 108 and/or the catholyte 112 can include alkali metal or alkaline earth metal salts of carbonate or bicarbonate, nitrate, nitrite, sulfate, sulfite, phosphate, or any other suitable salt.

The cathode 114 comprises anodized silver and the anode 110 can be of any material electrochemically compatible with the anolyte 108 to support electrochemical oxidation.

The system 100 additionally comprises a power source 116, configured to apply an electric potential between the cathode 114 and the anode 110. The power source 116 can be configured for electrical attachment to anode 110 and the cathode 114 via one or more external conductors and should be capable of applying an electric potential at the cathode 114 sufficient to cause electrochemical reduction of carbon dioxide to carbon monoxide.

In some implementations, the system 100 will also include a gas input member 118, comprising means for introducing a gas into the cathode chamber 104 so that the gas contacts and dissolves in the catholyte 112. The gas input member 118 can comprise a conduit, an aperture, or any other means for directing a gas or gas stream into the cathode chamber 104. In some implementations, the system 100 can optionally include a gas output member 120, comprising means for product gas to exit the cathode chamber 104.

The system 100 can potentially accommodate a cathodic half-reaction according to Reaction I:

$$CO_2+4e^-+4H\rightarrow CO+2H_2O \quad \text{I.}$$

The system 100 can potentially accommodate a competing cathodic half reaction according to Reaction II:

$$2H^++2e^-\rightarrow H_2 \quad \text{II.}$$

In order to cause Reaction I to occur at the cathode 114, the power source 116 can be operable to apply an electric potential of at least −0.7 V (vs. Ag/AgCl). In some instances, it may be preferable for the power source 116 to apply a negative electric potential at the cathode 114 which is greater in magnitude than −0.7 V (vs. Ag/AgCl). In some implementations, the power source 116 can apply a negative electric potential at the cathode 114 having a magnitude of at least −1.0 V (vs. Ag/AgCl). In some implementations, the power source 116 can apply a negative electric potential at the cathode 114 within a range of −0.7 through −1.5 V (vs. Ag/AgCl).

Figure 2:
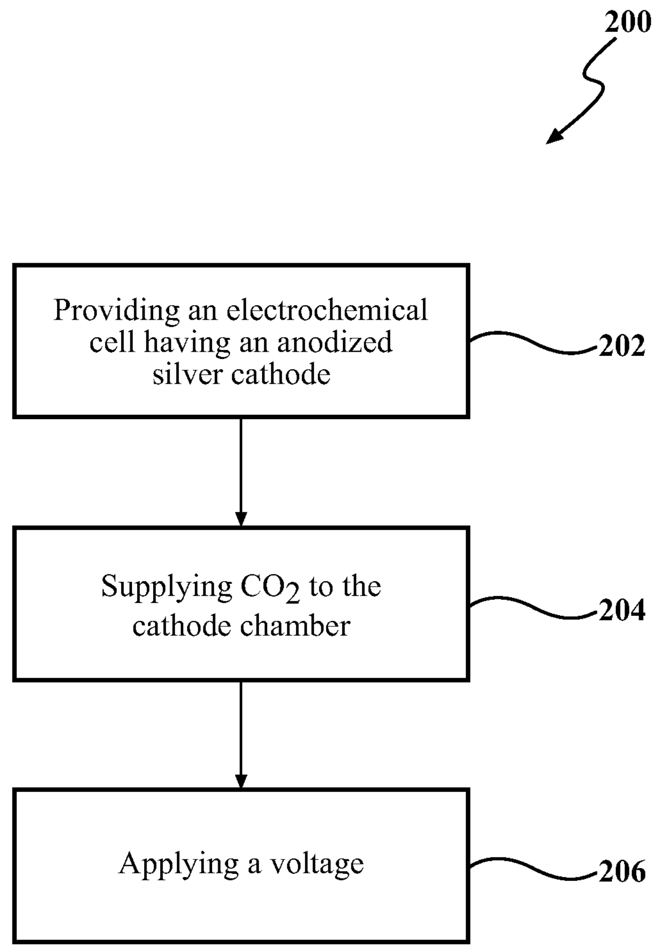
FIG. 2 is a schematic diagram of a method for the electrochemical reduction of carbon dioxide.

Also disclosed is a method for electrochemical reduction of carbon dioxide. As illustrated in FIG. 2, the method 200 includes a step 202 providing an electrolytic cell. The electrolytic cell is as described above, having an anode chamber 102 with anolyte 108 and catholyte 112; and a cathode chamber 104 with a catholyte 112 and a cathode 114 comprising anodized silver. The method 200 can include another step 204 of supplying carbon dioxide to the cathode chamber 104. The supplying step can be undertaken, for example, by causing a stream of gas which contains, or is enriched with, carbon dioxide to flow into the cathode chamber 104 via the gas input member 118. The method 200 additionally includes a step of applying an electric potential (henceforth "a potential") between the cathode and the anode. The applying step can be achieved by electrically contacting a potential-generating power source 116 to each of the anode 110 and the cathode 114.

The method 200 for electrochemical reduction of carbon dioxide is generally characterized by the aspects of the electrochemical cell including the detailed aspects of the anode chamber 102; the anolyte 108; the anode 110; the cathode chamber 104; the catholyte 112; the cathode 114 comprising anodized silver; and the power source 116. The electrochemical cell as provided in the method 200 can also include the optional separator 106, the optional gas input member 118, and the optional gas outlet member 120 as described above in reference to the system 100 and FIG. 1.

Relating to both the system 100 and the method 200, the cathode 114 can be prepared by a process which includes putting a precursor anode in contact with an anodization electrolyte and applying a positive potential to the precursor anode. The precursor anode will contain elemental silver. The positive potential applied is relative to a reference electrode, and the anodization electrolyte can be any electrolyte suitable for the anodization of silver. Non-limiting examples of suitable anodization electrolytes can include aqueous solutions of alkali metal or alkaline earth metal salts of carbonate or bicarbonate, nitrate, nitrite, sulfate, sulfite, phosphate, or any other suitable electrolyte.

In some implementations, the anodization potential can be applied for a specified duration of time, the product of the positive potential magnitude and the specified duration being at least 3.75 volt•minutes (V•min). In some implementations the product of the positive potential magnitude and the duration is at least 11.25 V•min. In some implementations, the product of the positive potential magnitude and the duration is less than 34.25 V•min.

Referring now to FIGS. 3-7, four apparatus for electrochemical reduction of carbon dioxide to carbon monoxide were prepared. Three of the four apparatus are each an example of the system 100 prepared and operated by the method 200 of the present disclosure. The three example apparatus each employ a cathode 114 which was anodized for 5, 15, or 30 minutes at 0.75 V vs. Ag/AgCl in 0.1 M $NaNO_3$ opposite a platinum counter electrode. The fourth apparatus employs a non-anodized silver cathode (alternatively described as a cathode anodized for 0 minutes) and thus is not an example of the disclosed system 100 or method 200, but is instead a comparative example.

Figure 3:
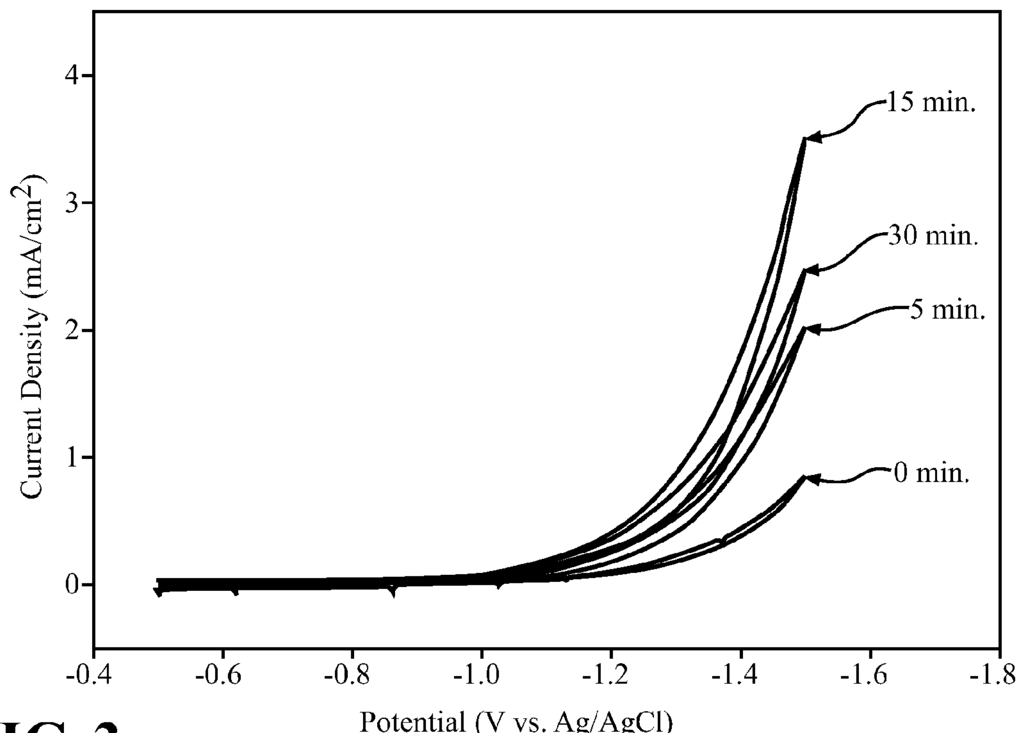
FIG. 3 is a graph of cyclic voltammograms of four systems of the type shown in FIG. 1 where the cathode has been anodized for 0, 5, 15, or 30 minutes.

As shown in FIG. 3, cyclic voltammograms of the four apparatus show an increase in maximum current density and a decrease in applied potential at which current density rises for the three examples of the system 100 as prepared and operated by the method 200, relative to the comparative example employing a non-anodized silver cathode (referred to generally as a current density response). The data of FIG. 3 also indicate that the current density response increases from 5 minutes to 15 minutes anodization duration, but then decreases at 30 minutes anodization duration.

Figure 4:
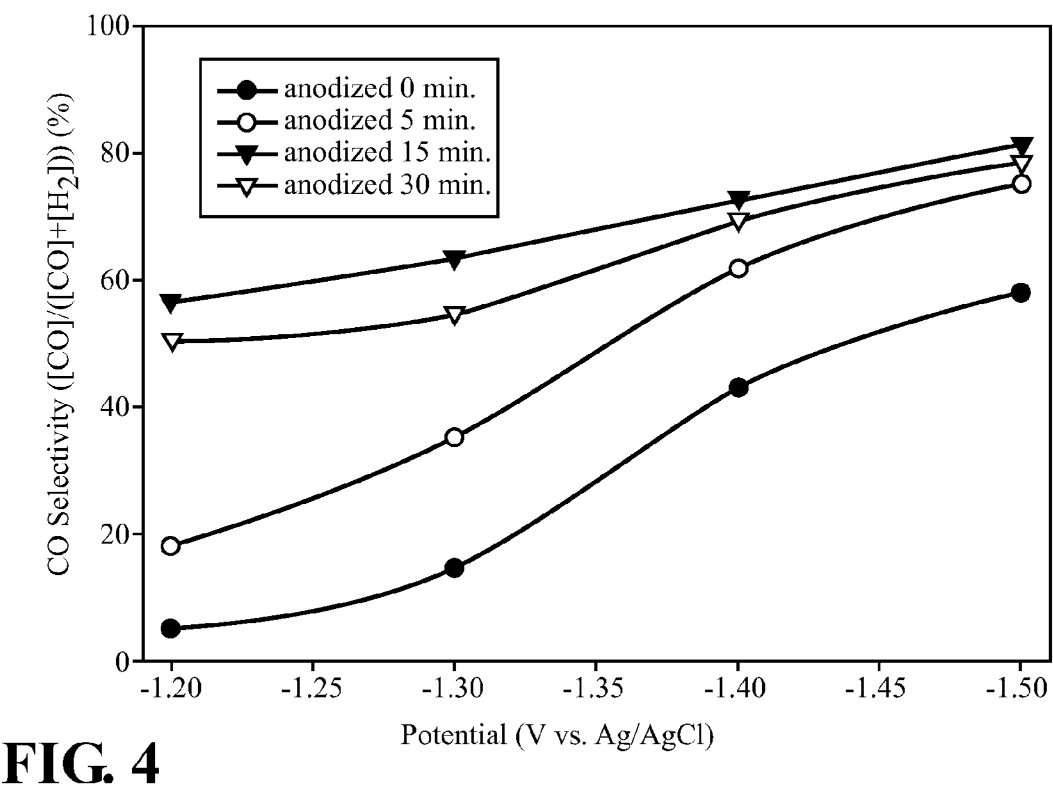
FIG. 4 is a plot of carbon monoxide selectivity at varying potential for each of the systems of FIG. 3.

As shown in FIG. 4, carbon monoxide production selectivity, defined as the ratio of the molar quantity of carbon monoxide evolved at the cathode to the sum of the molar quantities of carbon monoxide and hydrogen evolved at the cathode, shows a similar pattern. This effect of enhanced carbon monoxide selectivity associated with cathode 114 anodization is particularly evident at lower applied potentials (or overpotentials), with a carbon monoxide selectivity of nearly 60% for the system 100 having a 15 minute anodized cathode 114 vs. a carbon monoxide selectivity of about 5% for the comparative example having a non-anodized (0 minute anodized) cathode when operated at an overpotential of ~0.5 V.

Figure 5:
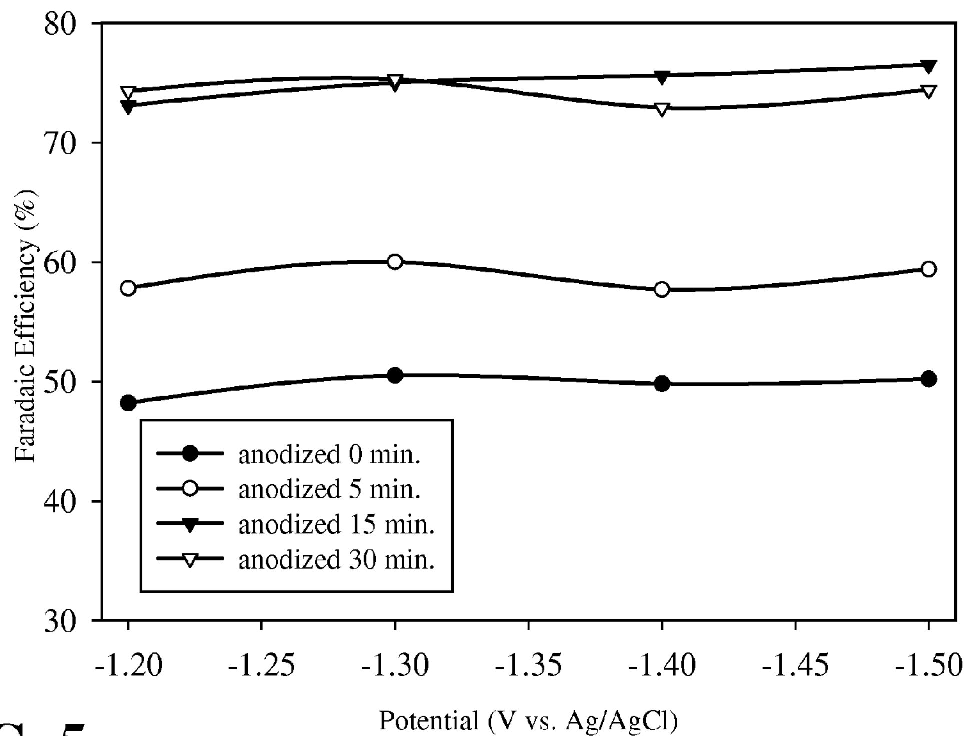
FIG. 5 is a graph of Faradaic efficiency at varying potential for each of the four systems of FIG. 3.

A similar trend is shown in the Faradaic efficiencies for carbon monoxide production of FIG. 5. For example, the system 100 having a cathode 114 anodized for 15 minutes has a Faradic efficiency of ~75% at all overpotentials, whereas the comparative example having a non-anodized cathode has Faradaic efficiency for carbon monoxide production of ~50% at all overpotentials.

Figure 6:
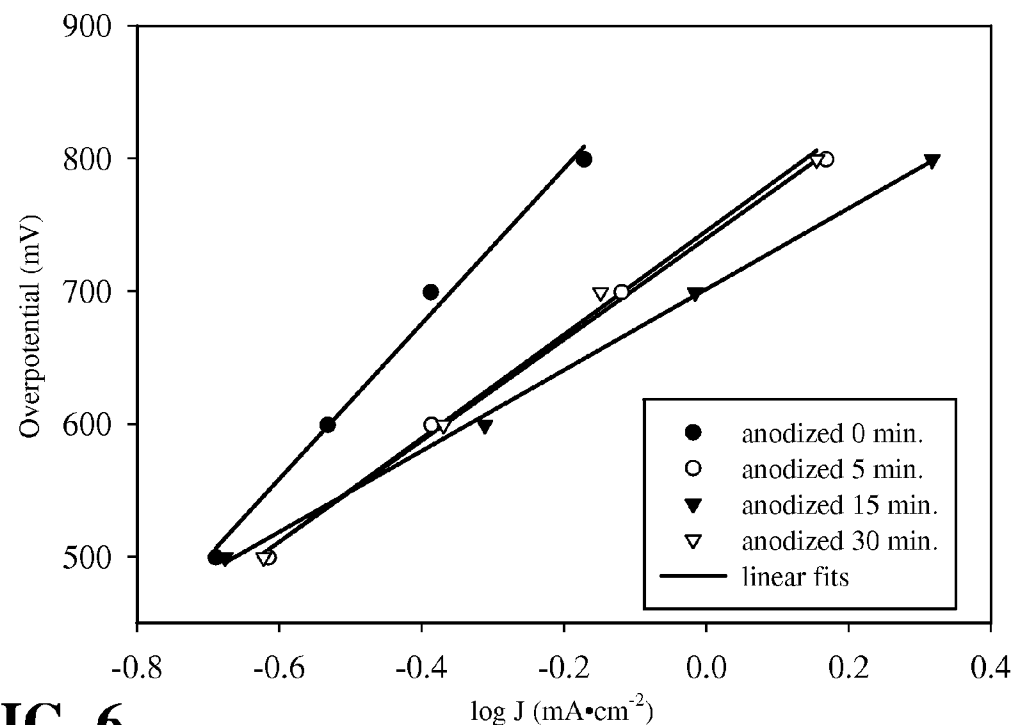
FIG. 6 is a Tafel diagram for each of the four systems of FIG. 3.

The Tafel diagram of FIG. 6 likewise shows a comparable response. Tafel slope decreases with increasing cathode anodization duration from 0, to 5, to 15 minutes. But the Tafel slope of the system 100 having the cathode 114 anodized for 30 minutes duration shows a decrease, being largely identical to that of the system 100 having a cathode 114 anodized for 5 minutes. The Tafel slopes for the apparatus having cathodes anodized for 0, 5, 15, and 30 minutes are 584, 381, 305, and 390 mV/decade, respectively.

Figure 7:
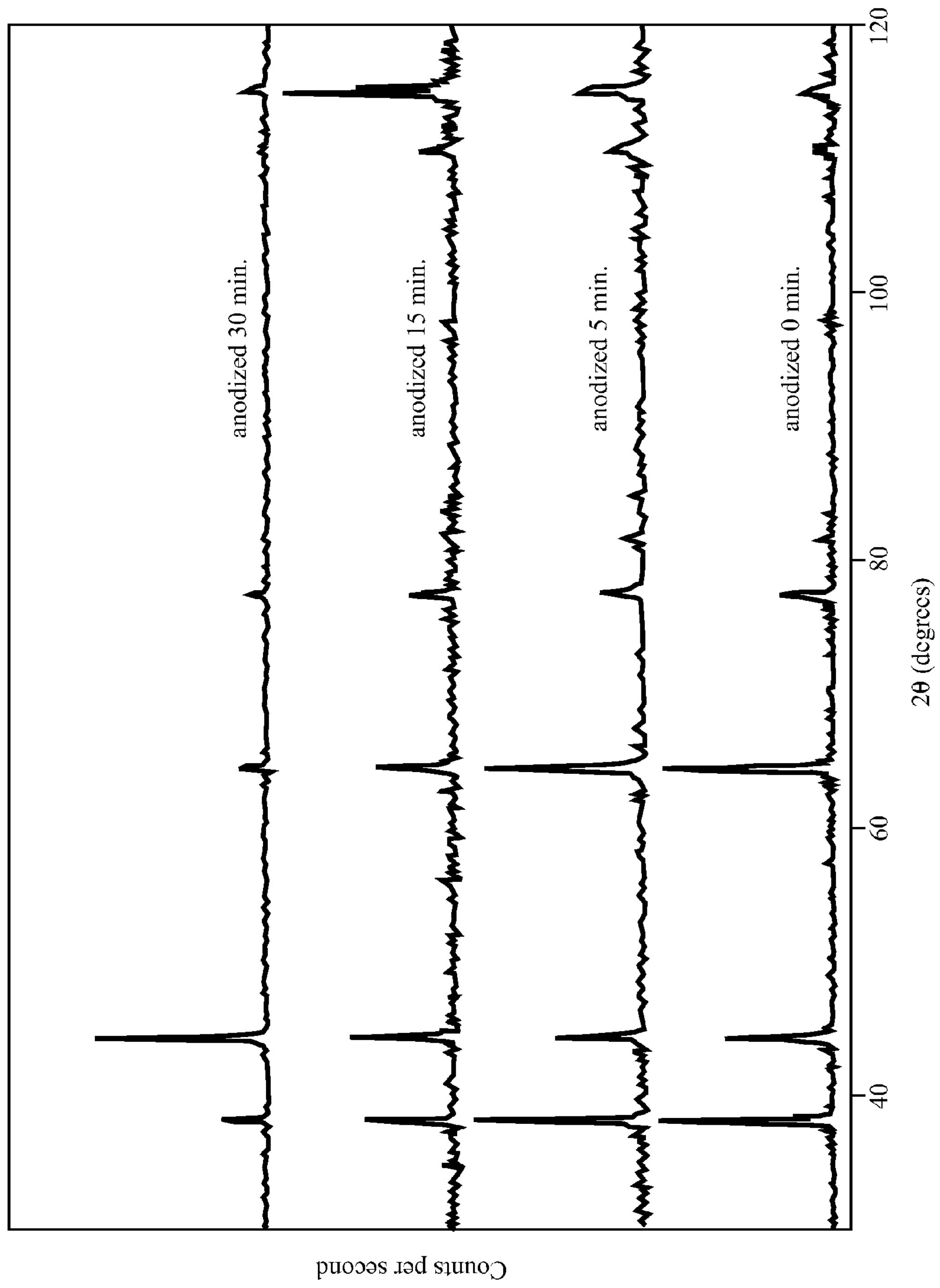
FIG. 7 is a plot of x-ray diffraction data for each of the four systems of FIG. 3.

FIG. 7 shows x-ray diffraction (XRD) data for the surfaces of cathodes having been subjected to 0, 5, 15, and 30 minutes anodization as described. The four XRD data sets all have peaks centered at about 38°, 43°, 63°, 78°, 115°, and 118°, but the relative intensities of the peaks change with varying anodization duration suggesting a change in surface silver crystallite orientation as a function of silver anodization and anodization duration. In particular, the intensity of the peak centered at about 118° is similar to trends discussed above in reference to FIGS. 3-6 with intensity increasing with increasing cathode anodization duration for 0 to 15 minutes, and then decreasing from cathode anodization duration from 15 minutes to 30 minutes.

Based on this result, and without intending to be bound to any particular theory, it is believed that the improvement in current density, carbon monoxide production selectivity, and carbon monoxide production faradaic efficiency associated with silver cathode anodization results, at least in part, to changes in silver crystallite orientation resulting from anodization. It can be noted in particular that maximum $CO_2$ reduction efficiency and selectivity are associated with maximization of a ratio of intensity of an XRD peak centered at about 118° to intensity of an XRD peak centered at about 43°. In some instances, the ratio can be at least 1:1. In some instances, the ratio can be at least 2:1. It is to be understood that the term "intensity" and the phrase "intensity of an XRD peak", as used here, refer to the area under the peak in question, rather than to maximum peak height.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

EXAMPLE 1

Preparation of Anodized Silver Cathodes

Anodization treatment was conducted in 0.1 M $NaNO_3$ with platinum as the counter electrode and Ag/AgCl as the reference electrode. A potential of 0.75V (vs. Ag/AgCl) was applied to three separate silver plate electrodes for 5, 15, or 30 minutes respectively.

EXAMPLE 2

Preparation of and Operation of Systems for Electrochemical Reduction of $CO_2$ Four 2-chamber electrolytic cells were prepared. Each had a cathode chamber and an anode chamber containing $KHCO_3$ (0.1 M, aqueous) electrolyte while the anode chamber of each included a platinum electrode. Three of the electrochemical reduction systems utilized an anodized silver electrode of Example 1 as the cathode, while the fourth utilized a non-anodized silver plate electrode as cathode to serve as a comparative Example.

Electrolysis was performed with Ag/AgCl as the reference electrode. $KHCO_3$ (0.1 M, aqueous) was used as the supporting electrolyte. $CO_2$ was purged through the electrolyte for at least 15 minutes before starting each electrolysis experiment. Each electrolysis experiment was terminated after the transfer of 2 coulombs of total charge occurred. Gas phase products were analyzed using gas chromatography (GC).

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for electrochemical reduction of carbon dioxide, the method comprising:
- anodizing a precursor electrode containing elemental silver at constant electric potential to produce an anodized silver component;
- providing an electrochemical cell having:
  - a cathode chamber containing:
    - a catholyte; and
    - a cathode in contact with the catholyte, the cathode containing the anodized silver component; and
  - an anode chamber containing:
    - an anolyte; and
    - an anode in contact with the anolyte;
- supplying carbon dioxide to the cathode chamber; and
- applying a potential between the anode and the cathode, the potential sufficient to electrochemically reduce carbon dioxide present in the cathode chamber.

2. The method as recited in claim 1, wherein a surface of the cathode is characterized by an x-ray diffraction pattern having a peak centered at about 118° and a peak centered at about 43°; and wherein a ratio of intensity of the peak centered at about 118° to intensity of the peak centered at about 43° is at least 1:1.

3. The method as recited in claim 1, wherein the cathode chamber further includes a gas input member, the gas input member configured to supply a stream of gas to the catholyte, the stream of gas including carbon dioxide.

4. The method as recited in claim 1, wherein the catholyte, the anolyte, or both is an aqueous solution of at least one electrolytic salt, the electrolytic salt comprising an alkali metal or alkaline earth metal salt of carbonate or bicarbonate, nitrate, nitrite, sulfate, sulfite, or phosphate.

5. The method as recited in claim 1, wherein the electrochemical reduction of carbon dioxide results in production of carbon monoxide and production of hydrogen gas in the cathode chamber; wherein the method is characterized by a CO selectivity, the CO selectivity definable as a percent molar ratio of carbon monoxide to hydrogen gas produced; and wherein the CO selectivity is at least 50%.

6. The method as recited in claim 5, wherein the CO selectivity is greater than 60%.

7. The method as recited in claim 1, wherein the anodizing step is characterized by a multiplication product of the constant electric potential and a duration of time for which the constant electric potential is applied; and wherein said multiplication product is at least 3.75 V•min relative to Ag/AgCl.

8. The method as recited in claim 7, wherein the multiplication product of the constant electric potential and the duration of time is at least 7.5 V•min relative to Ag/AgCl.

9. A method for making an electrochemical cell for electrochemically reducing carbon dioxide, the method comprising:

anodizing a precursor electrode comprising elemental silver at a constant electric potential to produce an anodized silver component;

preparing a cathode chamber containing:

a catholyte; and a cathode in contact with the catholyte, the cathode containing the anodized silver component; and placing an anode chamber in ionic contact with the cathode chamber, the anode chamber containing:

an anolyte; and an anode in contact with the anolyte.

10. An electrochemical cell produced by the method of claim 9.

11. The electrochemical cell as recited in claim 10, wherein a surface of the cathode is characterized by an x-ray diffraction pattern having a peak centered at about 118° and a peak centered at about 43°; and wherein a ratio of intensity of the peak centered at about 118° to intensity of the peak centered at about 43° is at least 1:1.

12. The electrochemical cell as recited in claim 10, wherein the cathode chamber further includes a gas input member, the gas input member configured to supply a stream of gas to the catholyte, the stream of gas including carbon dioxide.

13. The electrochemical cell as recited in claim 10, wherein the catholyte, the anolyte, or both is an aqueous solution of at least one electrolytic salt, the at least one electrolytic salt comprising an alkali metal or alkaline earth metal salt of carbonate or bicarbonate, nitrate, nitrite, sulfate, sulfite, or phosphate.

14. The electrochemical cell as recited in claim 10, wherein the anodizing step is characterized by a multiplication product of the constant electric potential and a duration of time for which the constant electric potential is applied; and wherein said multiplication product is at least 3.75 volt•minutes (V•min) relative to Ag/AgCl.

15. The electrochemical cell as recited in claim 14, wherein the multiplication product of the constant electric potential and the duration of time is at least 7.5 V•min relative to Ag/AgCl.

16. The electrochemical cell as recited in claim 10, wherein the electrochemical cell is operable for production of both carbon monoxide and hydrogen gas in the cathode chamber; wherein the electrochemical cell is characterized by a CO selectivity, the CO selectivity definable as a percent molar ratio of carbon monoxide to hydrogen gas produced; and wherein the CO selectivity is at least 50%.

17. The electrochemical cell as recited in claim 16, wherein the CO selectivity is greater than 60%.

* * * * *